(12) United States Patent
Clifton

(10) Patent No.: US 9,115,990 B2
(45) Date of Patent: Aug. 25, 2015

(54) GEOSPATIAL AND IMAGE DATA COLLECTION SYSTEM INCLUDING IMAGE SENSOR FOR CAPTURING 3D GEOSPATIAL DATA AND 2D IMAGE DATA AND RELATED METHODS

(75) Inventor: William Earle Clifton, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 831 days.

(21) Appl. No.: 13/352,603

(22) Filed: Jan. 18, 2012

(65) Prior Publication Data

US 2013/0182075 A1 Jul. 18, 2013

(51) Int. Cl.
*G01C 11/02* (2006.01)
*G01S 17/89* (2006.01)
*G01S 17/02* (2006.01)

(52) U.S. Cl.
CPC .............. *G01C 11/02* (2013.01); *G01S 17/023* (2013.01); *G01S 17/89* (2013.01)

(58) Field of Classification Search
CPC ..... H04N 7/181; H04N 5/23238; H04N 5/28; H04N 7/18; H04N 5/232
See application file for complete search history.

(56) References Cited

U.S. PATENT DOCUMENTS

| | | | |
|---|---|---|---|
| 6,323,941 B1 | 11/2001 | Evans et al. ................... 356/4.01 |
| 6,664,529 B2 | 12/2003 | Pack et al. ................... 250/208.1 |
| 6,864,965 B2 | 3/2005 | DeFlumere ................... 356/4.01 |
| 6,882,409 B1 | 4/2005 | Evans et al. ................... 356/4.01 |
| 7,411,662 B1 | 8/2008 | Ruff et al. ...................... 356/5.15 |
| 7,858,917 B2* | 12/2010 | Stern et al. ................. 250/214 R |
| 7,961,301 B2 | 6/2011 | Earhart et al. ............... 356/4.01 |
| 7,991,222 B2 | 8/2011 | Dimsdale et al. ............. 382/154 |
| 2004/0046864 A1 | 3/2004 | Gross et al. ...................... 348/52 |
| 2007/0162193 A1* | 7/2007 | Garceau et al. ................... 701/3 |
| 2010/0208244 A1* | 8/2010 | Earhart et al. ........... 356/139.01 |

* cited by examiner

*Primary Examiner* — Tat Chio
(74) *Attorney, Agent, or Firm* — Allen, Dyer, Doppelt, Milbrath & Christ, P.A.

(57) ABSTRACT

A geospatial and image data collection system includes a laser source configured to direct laser radiation toward a geospatial area, and an image sensor. The image sensor is configured to be operable in a first sensing mode to sense reflected laser radiation from the geospatial area representative of three dimensional (3D) geospatial data, and a second sensing mode to sense ambient radiation from the geospatial area representative of two dimensional (2D) image data. In addition, a controller is configured to operate the image sensor in the first and second sensing modes to generate the 3D geospatial data and 2D image data registered therewith.

17 Claims, 4 Drawing Sheets

GEOSPATIAL AND IMAGE DATA COLLECTION SYSTEM INCLUDING IMAGE SENSOR FOR CAPTURING 3D GEOSPATIAL DATA AND 2D IMAGE DATA AND RELATED METHODS

FIELD OF THE INVENTION

The present invention relates to the field of data collection, and, more particularly, to a geospatial and image data collection system and related methods.

BACKGROUND OF THE INVENTION

Three dimensional (3D) models of geographical areas, such as topographical maps, may be used for many applications. For example, topographical models may be used in flight simulators. Furthermore, topographical models of man-made structures (e.g., cities) may be extremely helpful in applications such as cellular antenna placement, urban planning, disaster preparedness and analysis, and mapping, for example.

Various types and methods for making 3D models are presently being used. One common 3D model is the digital elevation model (DEM). A DEM is a sampled matrix representation of a geographical area which may be generated in an automated fashion by a computer. In a DEM, coordinate points are made to correspond with a height value.

In order to form DEMs and other topographical models, 3D geospatial data of a target area is first captured. This 3D geospatial data is often combined with 2D image data of that same target data to form a topographical model containing both elevation data as well as intensity data, with the intensity data representing what the target area "looks" like when viewed as highlighted by background radiation, such as visible light from the sun.

Typically, the 3D geospatial data is taken using an active imaging system such as Light Detection and Ranging (LIDAR), and the 2D image data is taken at a later point in time using a passive imaging system such as an image sensor made from conventional photodiodes. To combine the 3D geospatial data with the 2D image data, image registration techniques are used.

An example of such an imagine system is described in U.S. Pat. No. 6,882,409 to Evans et al. Evans et al. discloses a multi-spectral detector for use in a passive/active system. The multi-spectral detection system comprises an optically dispersive element, a detector array, and an integrated circuit. The optically dispersive element is capable of separating received LADAR radiation, and ambient radiation received from a scene into a plurality of spectral components and distributing the separated spectral components. The system also includes a detector array. The detector array includes a plurality of detectors capable of detecting the LADAR radiation, and a plurality of detectors capable of detecting the spectral components of the scene radiation. The integrated circuit is capable of generating a plurality of electrical signals representative of predetermined characteristics of the detected LADAR radiation and the detected spectral components. Thus, this system captures 3D geospatial data using one sensor, captures 2D intensity data with another sensor, and then combines the data, similarly as described above.

Systems such as the Evans et al. system described above, however, often use image registration techniques to combine the 3D and 2D data. These image registration techniques may be costly in terms of computing power, and may not produce desirable results in some situations. As such, further development of geospatial and image collection systems are desired.

SUMMARY OF THE INVENTION

In view of the foregoing background, it is therefore an object of the present invention to provide a geospatial and image collection system capable of producing 3D geospatial data with 2D image data registered thereto.

This and other objects, features, and advantages in accordance with the present invention are provided by a geospatial and image data collection system that comprises a laser source configured to direct laser radiation toward a geospatial area, and an image sensor. The image sensor is configured to be operable in a first sensing mode to sense reflected laser radiation from the geospatial area representative of three dimensional (3D) geospatial data, and a second sensing mode to sense ambient radiation from the geospatial area representative of two dimensional (2D) image data. A controller is configured to operate the image sensor in the first and second sensing modes to generate the 3D geospatial data and 2D image data registered therewith.

This system is particularly advantageous because the 3D geospatial data and 2D image data are registered to each other, with no need for image registration techniques, due to the fact that they are captured by the same image sensor. Such image registration techniques can be hardware intensive, and thus the production of systems using them can be costly.

The image sensor may comprise an array of Geiger mode avalanche photodiodes. In addition, the controller may be configured to operate the image sensor in the first sensing mode to capture a plurality of frames of 3D geospatial data, and to operate the image sensor in the second sensing mode to capture a plurality of frames of 2D image data between successive ones of the plurality of frames of 3D geospatial data.

The controller may be configured to measure a time of flight the laser radiation to thereby generate elevation data. In addition, the geospatial and image data collection system may include an image database configured to store additional 2D image data, and an image processor coupled to the image database and the controller, the image processor configured to register the 2D image data with the additional 2D image data.

A method aspect is directed to a method of operating a geospatial and image data collection system. The method includes directing laser radiation toward a geospatial area using a laser source. The method also includes operating an image sensor in a first sensing mode to sense reflected laser radiation from the geospatial area to generate three dimensional (3D) geospatial data, and operating the image sensor in a second sensing mode to sense ambient radiation from the geospatial area to generate two dimensional (2D) image data registered with the 3D geospatial data, using a controller.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
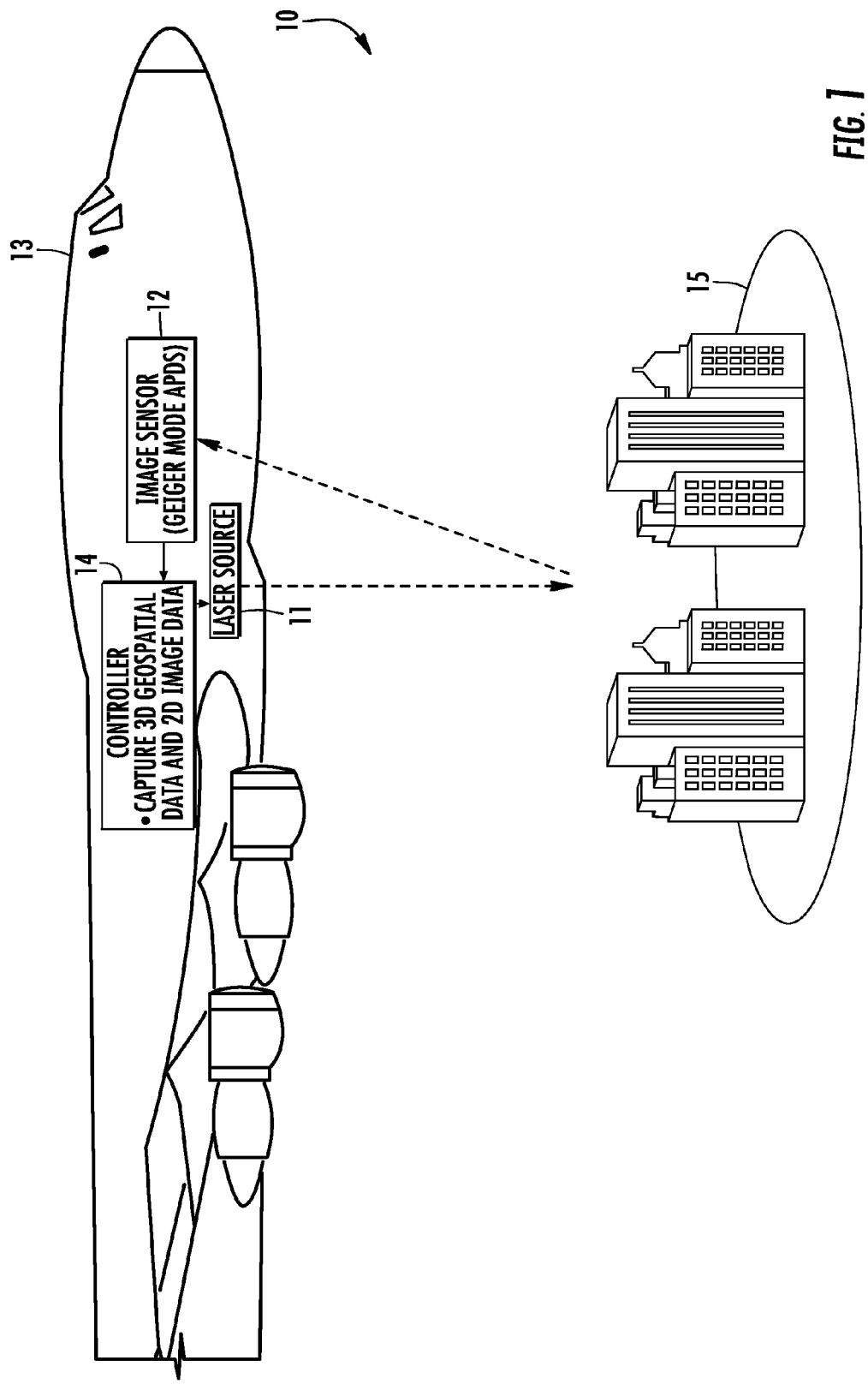
FIG. 1 is a schematic block diagram of a geospatial and image processing system in accordance with the present invention.
Figure 2:
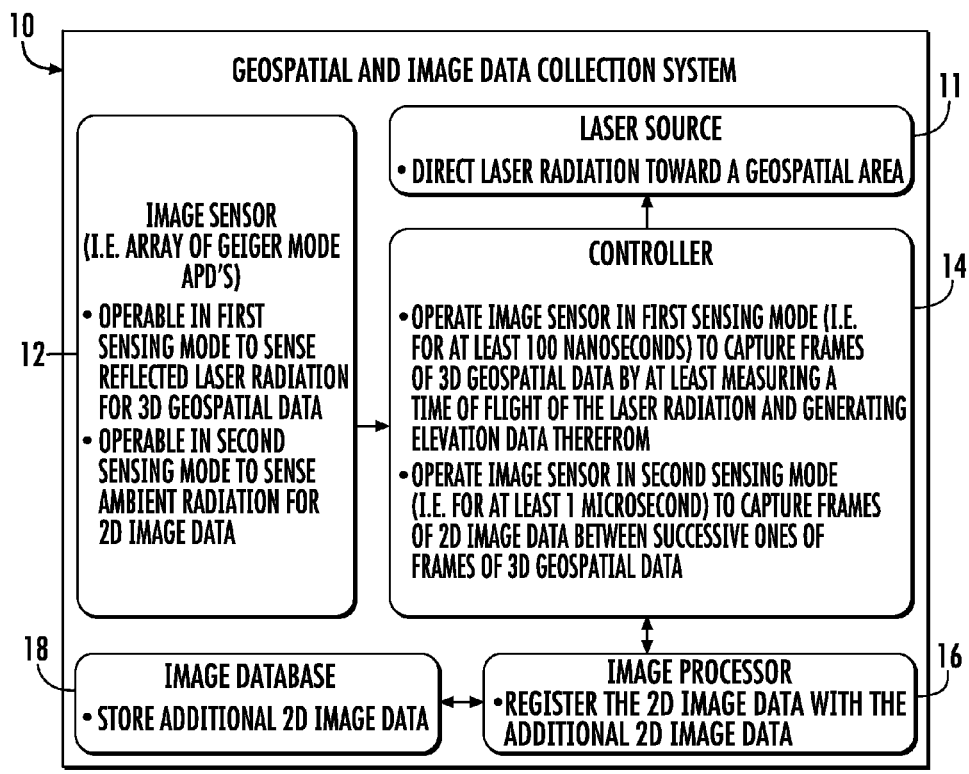
FIG. 2 is a more detailed schematic block diagram of the geospatial and image processing system in accordance with the present invention.

Referring initially to FIGS. 1-2, a geospatial and image data collection system 10 is now described. The system 10 may be carried by an aircraft 13, as shown in FIG. 1, and includes a laser source 11 for directing laser radiation toward a geospatial area 15. An image sensor 12 is operable in a first sensing mode to sense reflected laser radiation from the geospatial area representative of 3D geospatial data. Since, in this first sensing mode, the image sensor 12 is sensing reflections from radiation output by the laser source 11, this first sensing mode can be referred to as the active sensing mode. The image sensor 12 is also operable in a second sensing mode to sense ambient radiation from the geospatial area representative of 2D image data. Since, in this second sensing mode, the image sensor 12 is sensing ambient radiation reflected from the geospatial area, this second sensing mode can be referred to as the passive sensing mode. The image sensor 12 preferably comprises an array of Geiger mode avalanche photodiodes, which will now be described in detail.

The output current of a typical (non Geiger mode) avalanche photodiode is linearly proportional to the incident photocurrent if the reverse-bias voltage across the photodiode is maintained below a critical level. Above this critical level, or avalanche breakdown voltage, the absorption of a single photon can create an avalanche current pulse large enough to be detectable by digital timing circuitry.

Geiger mode avalanche photodiodes are a particularly useful kind of avalanche photodiode. The fundamental difference between a Geiger mode avalanche photodiode and a typical avalanche photodiode is that Geiger mode avalanche photodiodes are specifically designed to operate with a reverse bias voltage well above the breakdown voltage. On the contrary, typical avalanche photodiodes operate at a bias lesser than the breakdown voltage).

Geiger mode avalanche photodiodes are readily integrated into image sensors 12, and provide significant advantages. For example, the image sensor 12, due to the Geiger mode avalanche photodetectors, is capable of single-photon sensitivity and subnanosecond timing due to the sharp leading edge of avalanche current and that the avalanche can be detected by simple CMOS digital timing circuitry. An important characteristic of the Geiger mode photodiodes is that once an avalanche has occurred, the avalanched photodiode will no longer respond to additional signal photons until it has been reset. The reset times are less than 50 nanoseconds, and given that the pulse repetition interval a typical laser source 11 is often on the order of tens or hundreds of microseconds, the reset time, has no negative impact on system performance.

Operation of the image sensor 12 in the active mode is conceptually straightforward. A laser pulse emitted by the laser source 11 is used to illuminate the geospatial area 15 and by precisely measuring the time-of-flight recorded by each Geiger mode photodetector triggered by photons reflected from the geospatial area, the three dimensional XYZ position of each return can be determined.

Operation of the image sensor 12 in the passive mode relies on background radiation reflected off the scene and provides a two dimensional intensity representation of the scene. To form a passive image, the image sensor 12 is over-biased into Geiger mode for the duration of the gate. During the gate period, three outcomes are possible—a return is recorded due to a background photon, a return is recorded due to a dark count event, or no detection occurs. A two dimensional histogram can then be created from multiple gates, one XY bin per Geiger mode avalanche photodiode. The number of returns recorded in each detector bin can be represented by a shade of gray with the minimum displayed as black. The result is a two dimensional gray scale histogram or pseudo intensity image. Since the total noise rate is dominated by the background rate (i.e., incoherent photons reflected off the scene), the dark count rate has little impact on the final image except under extremely low light conditions. In addition to creating static 2D intensity images, capture of the 2D data at a high frame rate devices allow successive frames to be displayed at video frame rates (i.e., 30-60 Hz).

The controller 14 is coupled to the laser source 11 and image sensor 12 and configured to operate the image sensor in the active mode to capture a plurality of frames of 3D geospatial data by, as explained above, by measuring the time it takes a laser pulse to travel from the sensor to the target and back to the sensor (i.e. flight time). For example, operation of the sensor in the active mode may be performed for 100 to 200 nanoseconds, for example. The controller 14 is configured to operate the image sensor 12 in the passive mode to capture a plurality of frames of 2D image data between successive ones of the plurality of frames of 3D geospatial data. Operation in the passive mode may be performed for 1 to 2 microseconds, for example.

The capturing of the 3D geospatial data and 2D image data with the very same image sensor, and thus the very same Geiger mode avalanche photodiodes, in such a short period of time, means that the 3D geospatial data and the 2D image data are inherently registered to each other, and thus processing intensive image registration techniques need not be used when combining the data to create a digital model. This is particularly advantageous because it saves processing time, and potentially reduces the cost of the system 10.

Figure 3:
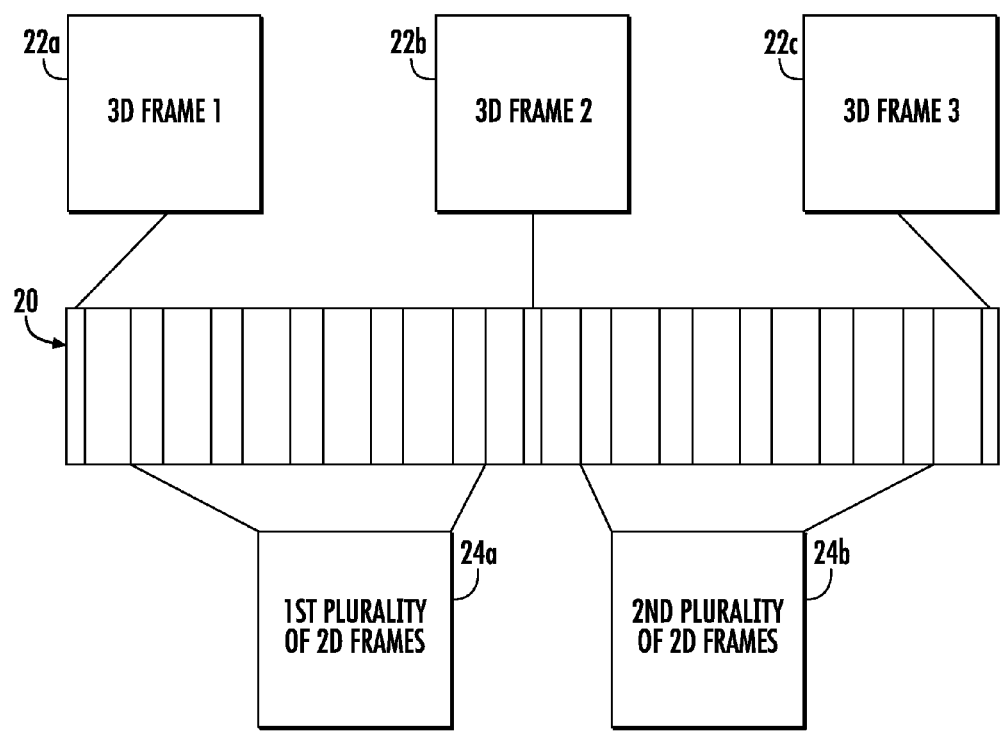
FIG. 3 is a schematic diagram of frames of 2D image data interleaved with frames of 3D geospatial data, during capture with the system of FIGS. 1-2.

The interleaving of the frames of 2D image data between frames of 3D geospatial data is perhaps best shown in FIG. 3. Here, a capture timeline 20 is shown. Three frames of 3D geospatial data 22a-22c are shown, with a first plurality of frames of 2D image data 24a between the first and second frames of 3D geospatial data, and with a second plurality of frames of 2D image data 24b between the second and third frames of 3D geospatial data.

Referring particularly to FIG. 2, the system 10 may optionally include an image database 18 configured to store additional 2D image data (for example, 2D image data of the geospatial area captured by a different image sensor, such as an infrared image sensor), and an image processor 16 coupled thereto. The image processor 16 is also coupled to the controller 14 and is configured to register the 2D image data with the additional 2D image data. A display, not shown, is typically coupled to the processor 16 to display the image data as will be appreciated by those skilled in the art. Since the additional 2D image data is captured by a different image sensor, standard image registration techniques are employed by the image processor 16 to register the additional 2D image data with the 2D image data (and thus also the 3D geospatial data). This is particularly useful in situations where 2D image data from both visible light image sensors and infrared or ultraviolet image sensors is desired to be registered with the 3D geospatial data.

Figure 4:
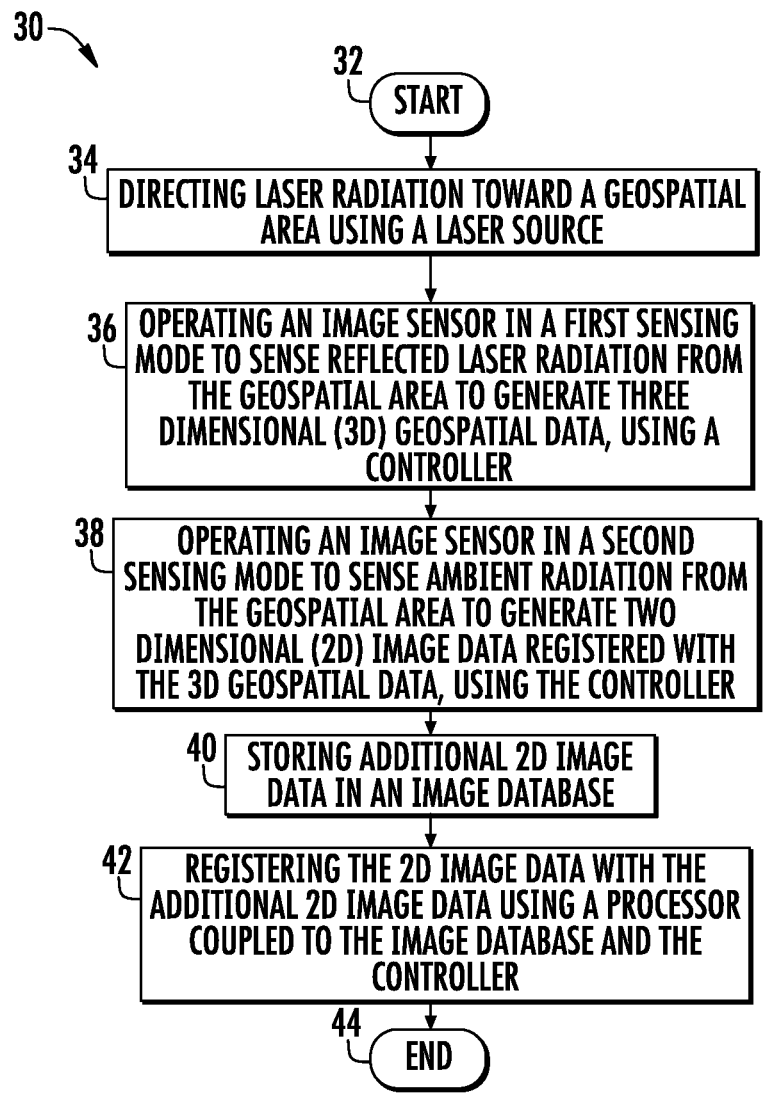
FIG. 4 is a flowchart of a method of operating a geospatial and image processing system in accordance with the present invention.

With reference to the flowchart 30 of FIG. 4, a method of operating a geospatial and image data collection is now described. After the start (Block 32), laser radiation is directed toward a geospatial area using a laser source (Block 34).

Thereafter, an image sensor operated in a first sensing mode to sense reflected laser radiation from the geospatial area to generate 3D geospatial data (Block 36). Then, the image sensor is operated in a second sensing mode to sense ambient radiation from the geospatial area to generate 2D image data (Block 38).

Next, additional 2D image data is stored in an image database (Block 40). Thereafter, the 2D image data is registered with the additional 2D image data using a processor coupled to the image database and the controller (Block 42). Block 44 indicates the end of the method.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial and image data collection system comprising:
    a laser source configured to direct laser radiation toward a geospatial area;
    an image sensor configured to be operable in a first sensing mode to sense reflected laser radiation from the geospatial area representative of three dimensional (3D) geospatial data, and a second sensing mode to sense ambient radiation from the geospatial area representative of two dimensional (2D) image data; and
    a controller configured to operate said image sensor in the first sensing mode to capture a plurality of frames of 3D geospatial data, and to operate said image sensor in the second sensing mode to capture a plurality of frames of 2D image data between successive ones of the plurality of frames of 3D geospatial data.

2. The geospatial and image data collection system of claim 1 wherein said image sensor comprises an array of Geiger mode avalanche photodiodes.

3. The geospatial and image data collection system of claim 1 wherein each frame of 3D geospatial data is captured by said image sensor operating in the first sensing mode for at least 100 nanoseconds.

4. The geospatial and image data collection system of claim 1 wherein each frame of 20 image data is captured by said image sensor operating in the second sensing mode for at least one microsecond.

5. The geospatial and image data collection system of claim 1 wherein said controller is configured to measure a time of flight of the laser radiation and generate elevation data therefrom.

6. The geospatial and image data collection system of claim 1 further comprising an image database configured to store additional 2D image data, and an image processor coupled to said image database and said controller, said image processor configured to register the 2D image data with the additional 2D image data.

7. A geospatial and image data collection system comprising:
    a laser source configured to direct laser radiation toward a geospatial area;
    an image sensor comprising an array of Geiger mode avalanche photodiodes configured to be operable in a first sensing mode to sense reflected laser radiation from the geospatial area representative of three dimensional (3D) geospatial data, and a second sensing mode to sense ambient radiation from the geospatial area representative of two dimensional (2D) image data; and
    a controller configured to operate said image sensor in the first sensing mode to capture a plurality of frames of 3D geospatial data, and to operate said image sensor in the second sensing mode to capture a plurality of frames of 2D image data between successive ones of the plurality of frames of 3D geospatial data, so as to generate the 3D geospatial data and 2D image data registered therewith.

8. The geospatial and image data collection system of claim 7 wherein each frame of 3D geospatial data is captured by said image sensor operating in the first sensing mode for at least 100 nanoseconds.

9. The geospatial and image data collection system of claim 7 wherein each frame of 2D image data is captured by said image sensor operating in the second sensing mode for at least 1 microsecond.

10. The geospatial and image data collection system of claim 7 wherein said controller is configured to measure a time of flight of the laser radiation and generate elevation data therefrom.

11. The geospatial and image data collection system of claim 7 further comprising an image database configured to store additional 2D image data, and an image processor coupled to said image database and said controller, said image processor configured to register the 2D image data with the additional 2D image data.

12. A method of operating a geospatial and image data collection system comprising:
    directing laser radiation toward a geospatial area using a laser source;
    operating an image sensor in a first sensing mode to sense reflected laser radiation from the geospatial area to capture a plurality of frames of three dimensional (3D) geospatial data, using a controller; and
    operating the image sensor in a second sensing mode to sense ambient radiation from the geospatial area to capture a plurality of frames of two dimensional (2D) image data between successive ones of the plurality of frames of 3D geospatial data, with the 2D image date being registered with the 3D geospatial data, using the controller.

13. The method of claim 12 wherein operating the image sensor comprises operating a plurality of Geiger mode avalanche diodes.

14. The method of claim 12 wherein each frame of 3D geospatial data is captured by the image sensor operating in the first sensing mode for at least 100 nanoseconds.

15. The method of claim 12 wherein each frame of 2D image data is captured by the image sensor operating in the second sensing mode for at least 1 microsecond.

16. The method of claim 12 wherein operating in the first sensing mode includes measuring a time of flight of the laser radiation and generating elevation data therefrom.

17. The method of claim 12 further comprising storing additional 2D image data in an image database, and registering the 2D image data with the additional 2D image data using a processor coupled to the image database and the controller.

* * * * *